US005889777A

United States Patent [19]
Miyao et al.

[11] Patent Number: 5,889,777
[45] Date of Patent: Mar. 30, 1999

[54] NETWORK SERVER

[75] Inventors: Yasuhiro Miyao; Akira Arutaki; Masahiko Honda, all of Tokyo, Japan

[73] Assignee: NEC Corporation, Tokyo, Japan

[21] Appl. No.: 734,663

[22] Filed: Oct. 21, 1996

[30] Foreign Application Priority Data

Oct. 23, 1995 [JP] Japan .................................. 7-274084

[51] Int. Cl.⁶ .................................................. H04L 12/56
[52] U.S. Cl. .......................................... 370/345; 370/466
[58] Field of Search .................................... 370/389, 395, 370/400, 401, 402, 403, 406, 407, 408, 409, 466, 467, 474, 465, 469

[56] References Cited

U.S. PATENT DOCUMENTS

| 5,410,535 | 4/1995 | Yang et al. | 370/445 |
|---|---|---|---|
| 5,444,702 | 8/1995 | Burnett et al. | 370/60.1 |
| 5,490,141 | 2/1996 | Lai et al. | 370/352 |
| 5,491,693 | 2/1996 | Britton et al. | 370/401 |
| 5,633,869 | 5/1997 | Burnett et al. | 370/396 |

FOREIGN PATENT DOCUMENTS

| 8-501424 | 2/1996 | Japan . |
|---|---|---|
| 8-102744 | 4/1996 | Japan . |
| 8-102746 | 4/1996 | Japan . |

OTHER PUBLICATIONS

Miyao et al., "ATM based Virtual LAN towards 'Function Space' Realization", *NEC Technical Journal*, vol. 48, No. 8, pp. 14–20 (1995).

Aramaki et al., "Development of ATM–based Virtual LAN platform LAN Emulation", *NEC Technical Journal*, vol. 48, No. 8, pp. 21–26 (1995).

ATM Forum 1994, LAN Emulation Over ATM Specification–Version 1.0, pp. 1–13.

"ATM Local Area Networks", IEEE Communications Magazine, pp. 86–88, Mar. 1994.

*Primary Examiner*—Dang Ton
*Attorney, Agent, or Firm*—Foley & Lardner

[57] ABSTRACT

A network server includes LAN terminating units, an ATM terminating unit, a data transfer unit, a multiple identifier check section, and a connection determination section. The LAN terminating units are connected to LAN terminals constituting virtual LAN segments and terminate protocols on the LAN MAC sublayer. The ATM terminating unit is connected to an ATM network and terminates the AAL and the ATM protocol. The data transfer unit transfers received data to one of the LAN terminating units and the ATM terminating unit in correspondence with the destination MAC address obtained from data received by the LAN terminating units and the ATM terminating unit. The multiple identifier check section checks at least the Ethernet type in the SNAP of the received data. When the data is transferred from the data transfer unit to the ATM terminating unit, the connection determination section determines an ATM connection to which the data is to be transmitted, on the basis of a set of the destination MAC address and the destination IP subnetwork address, obtained from the received data, and an identifier including at least the Ethernet type detected by the multiple identifier check section, and notifies the ATM terminating unit of the determined ATM connection.

8 Claims, 14 Drawing Sheets

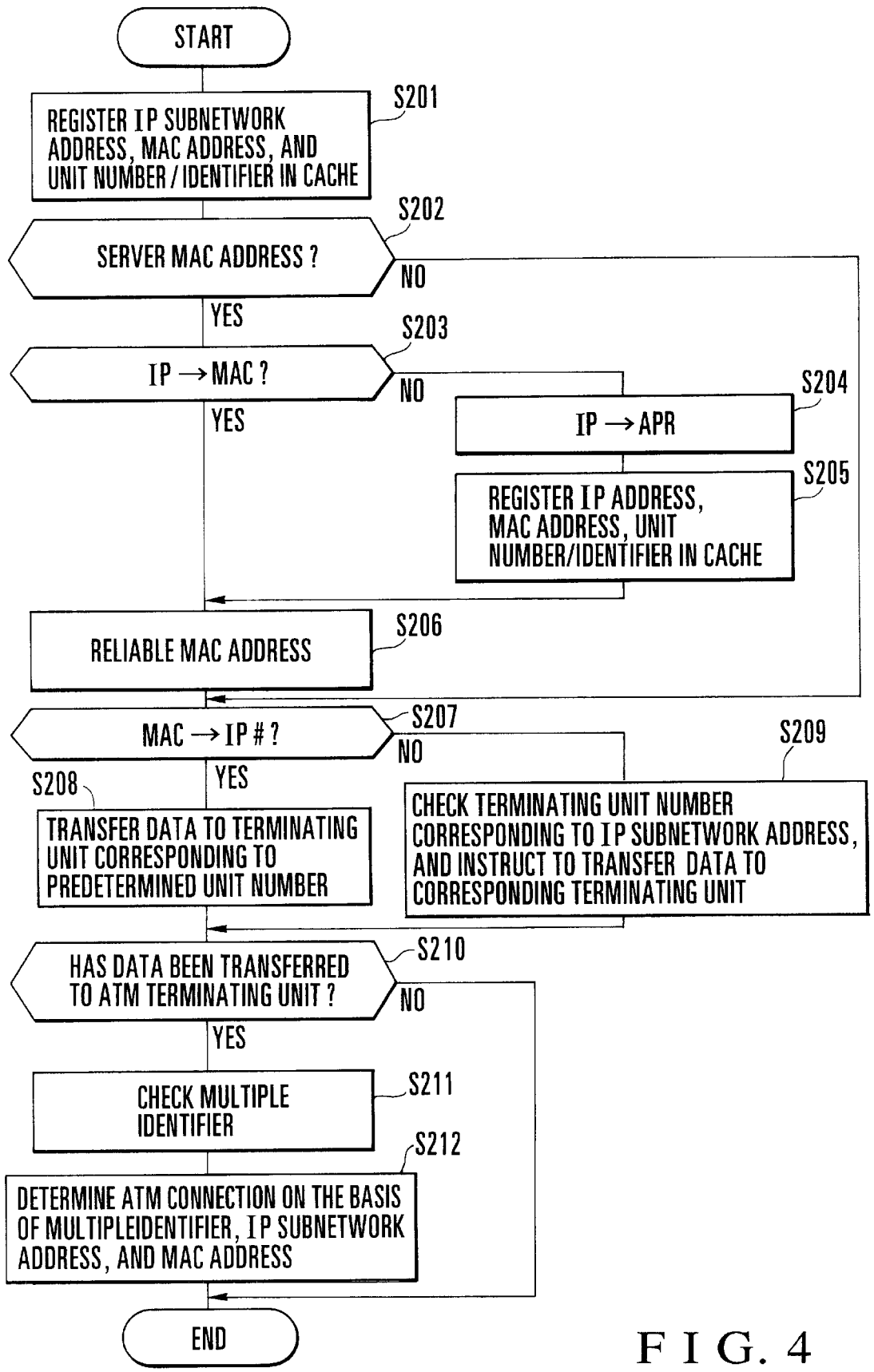
F I G. 4

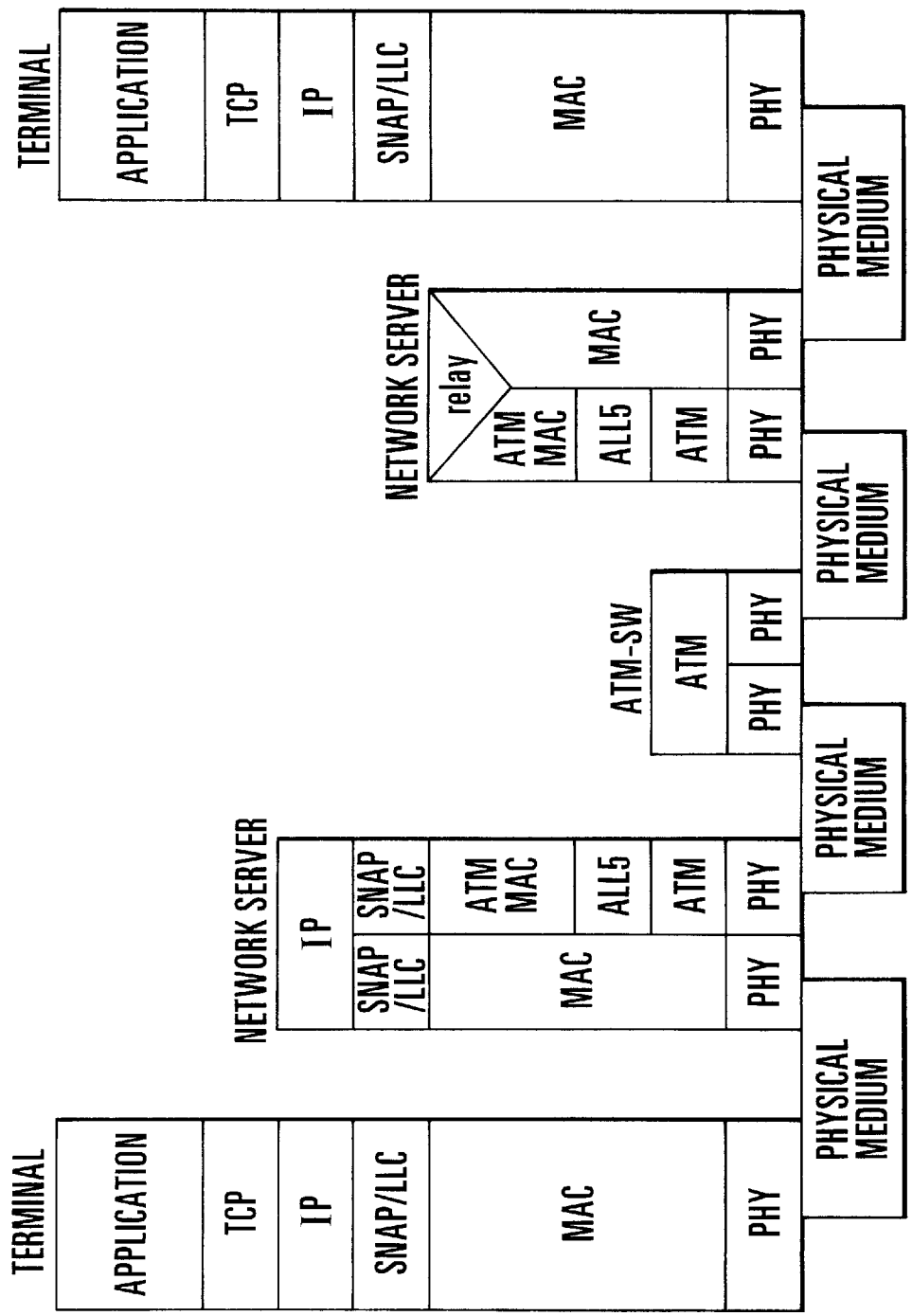
F I G. 5

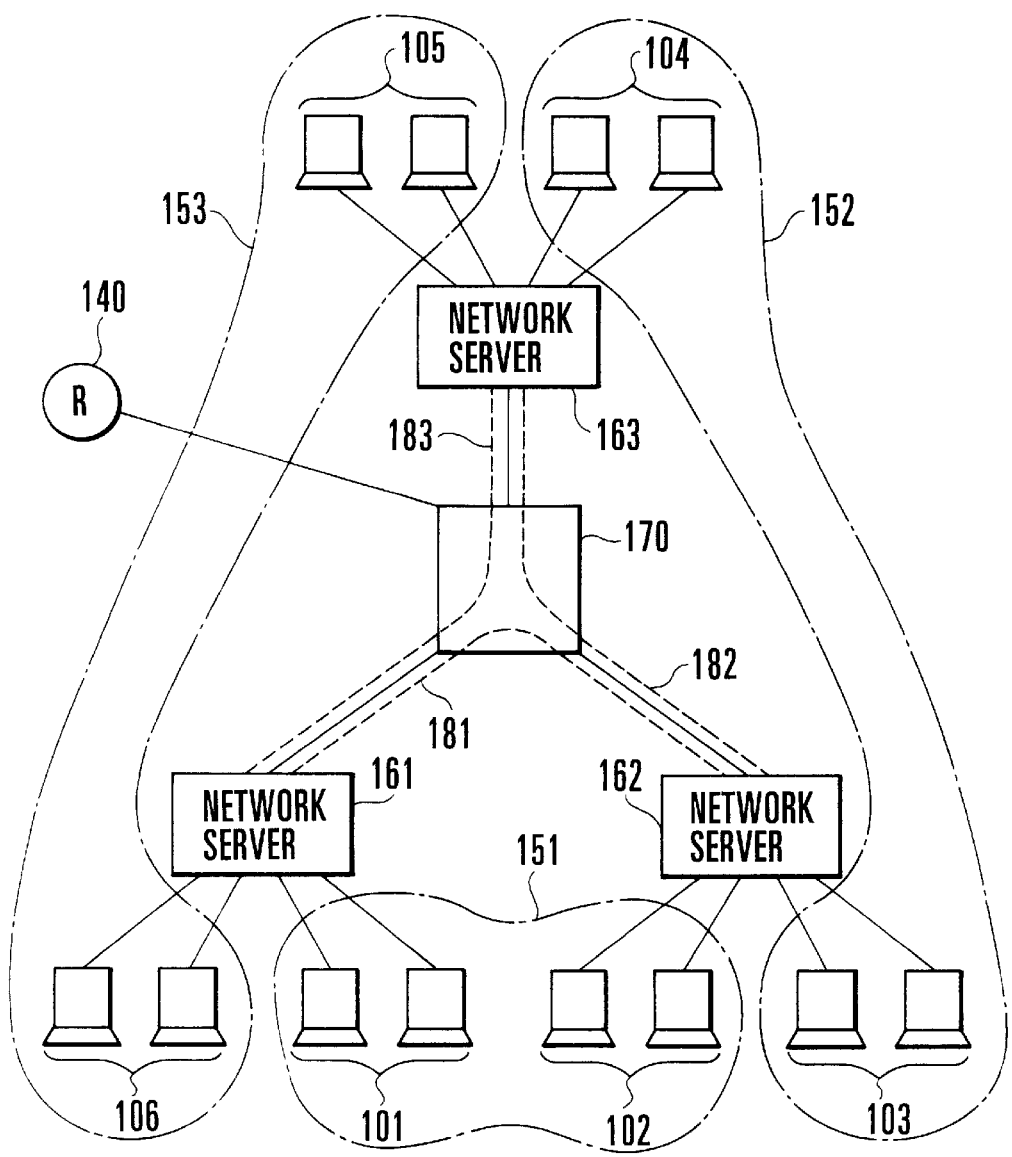
F I G. 9

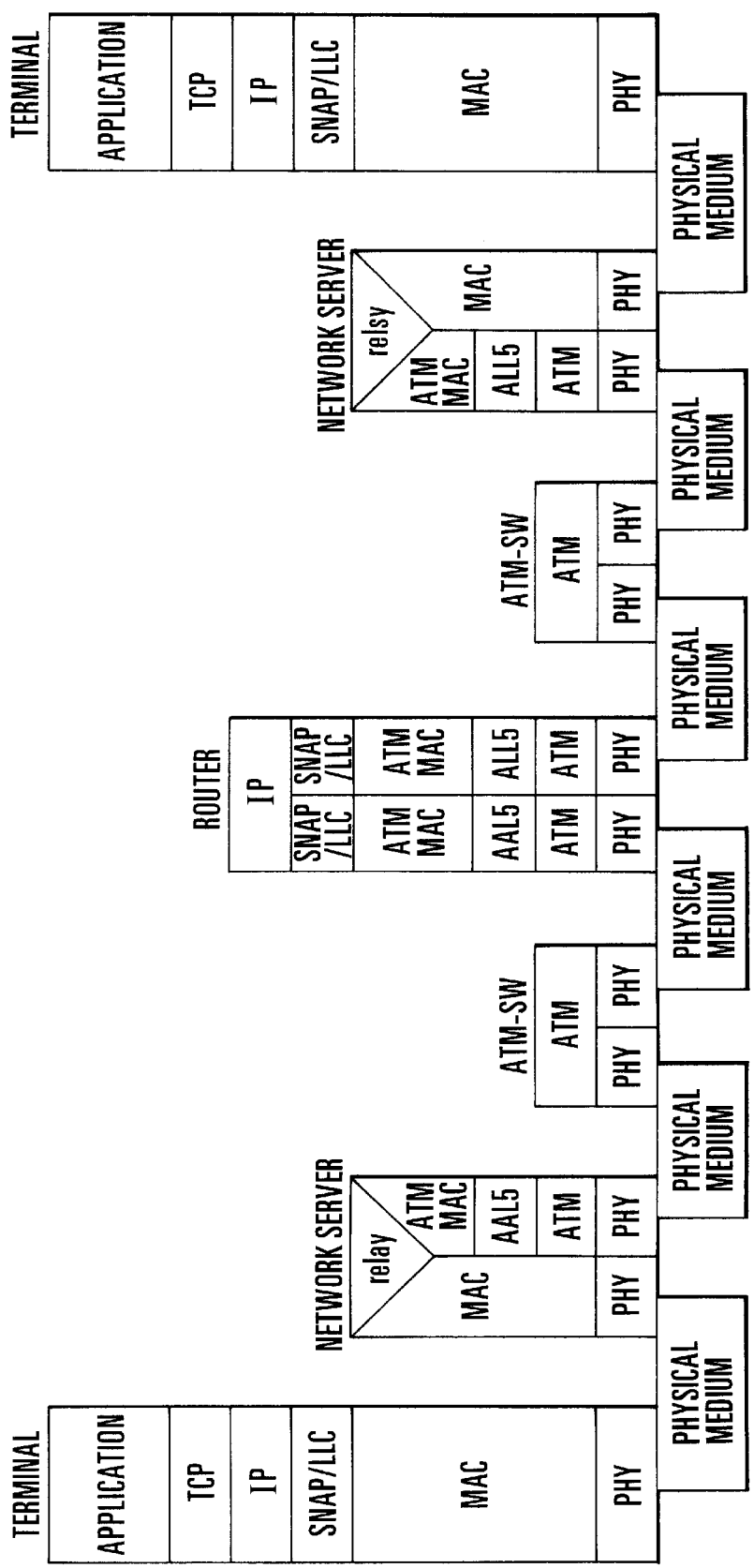
F I G. 11

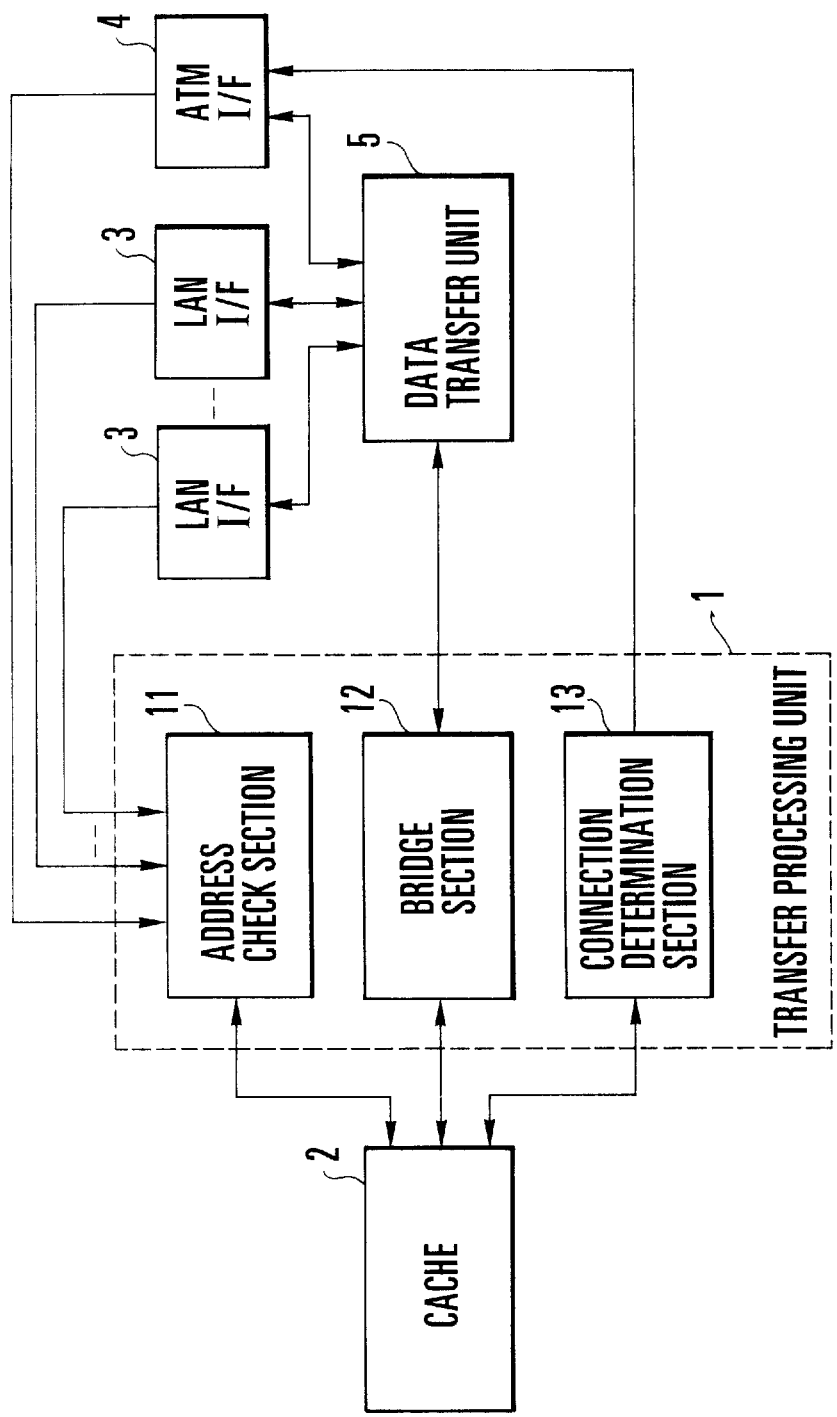
F I G. 12

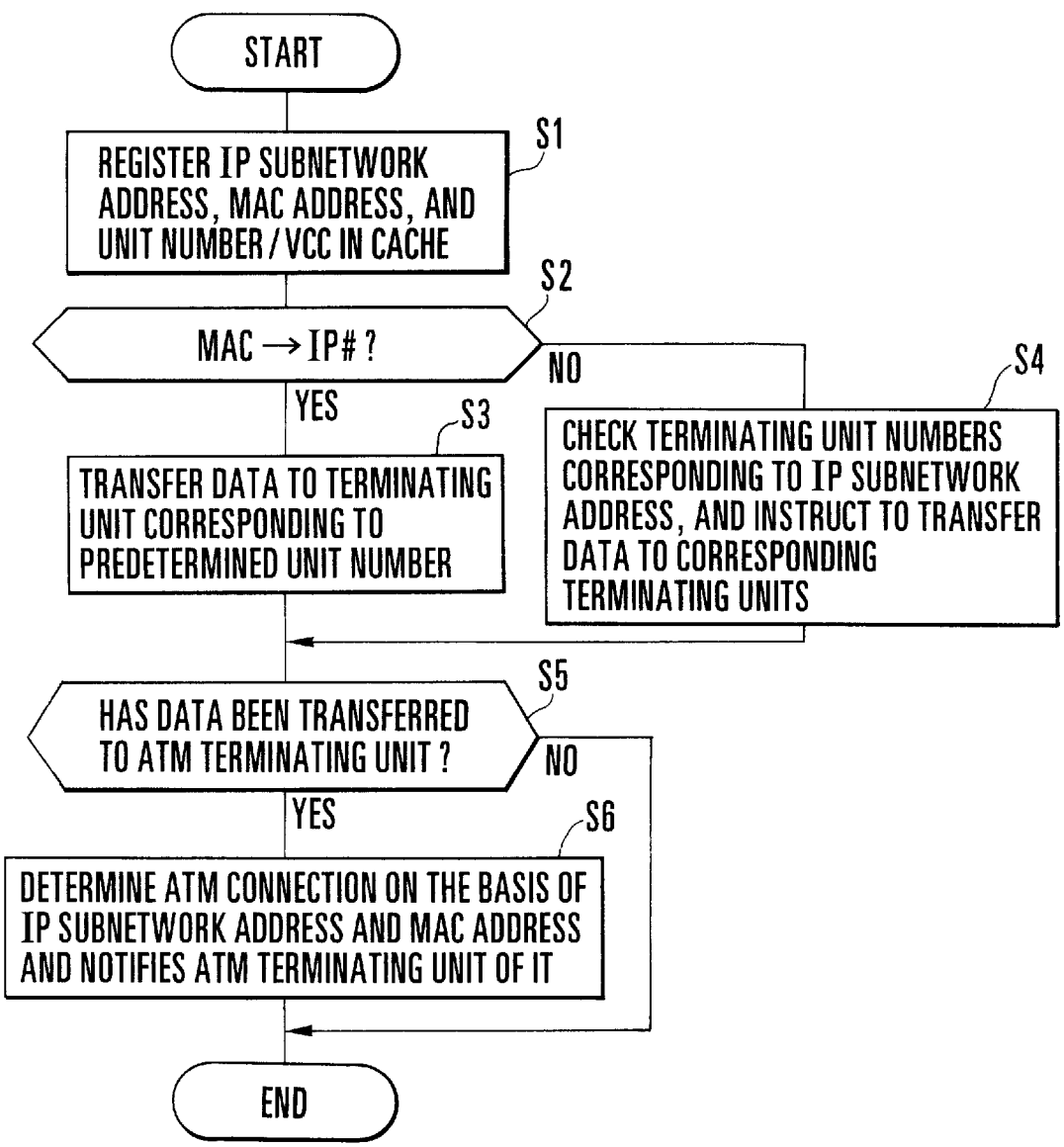
F I G. 13

NETWORK SERVER

BACKGROUND OF THE INVENTION

The present invention relates to a network server and, more particularly, to a network server which realizes a virtual LAN accommodating existing LAN (Local Area Network) terminals in an ATM (Asynchronous Transfer Mode) network regardless of the physical positions of the terminals.

In a conventional LAN, existing LAN terminals, which terminate LAN protocols such as CSMA/CD (Carrier Sense Multiple Access with Collision Detection) and token ring, and relay systems such as bridges and routers are coupled to each other in the form of a bus or ring through shared physical media, thereby constituting one LAN segment. In this case, a bridge is a relay system that couples different shared physical media to each other to constitute a single LAN segment, and a router is a relay system that couples different LAN segments to each other.

FIG. 6 explains the physical arrangement of an existing LAN. LAN terminal groups 101 and 102 are respectively coupled to shared physical media 111 and 112. The shared physical media 111 and 112 are coupled to each other through a bridge 121 to constitute a LAN segment 131. Similarly, LAN terminal groups 103 and 104 are respectively coupled to shared physical media 113 and 114 coupled to each other through a bridge 122, thus constituting a LAN segment 132. LAN terminal groups 105 and 106 are respectively coupled to shared physical media 115 and 116 coupled to each other through a bridge 123, thus constituting a LAN segment 133. These LAN segments 131 to 133 are coupled to each other through a router 140.

FIGS. 7A to 7D explain the logical arrangement of the existing LAN. FIG. 8 explains the header format of each protocol in the protocol stacks shown in FIGS. 7A to 7D. Operations for data transfer in the existing LAN will be described below with reference to FIGS. 7A to 7D and 8.

As shown in FIG. 7A, the MAC (Media Access Control) protocol is used to transfer data between LAN terminals coupled to each other in the same LAN segment. An MAC header contains a destination MAC address and a source MAC address. Data sent from a terminal (or an end system) or a relay system is broadcasted within the same LAN segment, and only the system which corresponds to the destination MAC address receives the data.

FIG. 7B shows a protocol stack used when data is transferred between LAN terminals coupled to different shared physical media in the same LAN segment by using a bridge. In this case as well, a relay operation is performed by using MAC addresses. A bridge which couples three or more shared physical media to each other transfers data to all the shared physical media except for the shared physical medium from which the data is received.

Assume that every time data is received, a set of a source MAC address and a number designating the shared physical medium from which the data is received is held in a cache table. In this case, by referring to the table, data can be transferred to a shared physical medium to which a system corresponding to a destination MAC address is coupled. Such a bridge is sometimes called a transparent bridge, in particular.

An SNAP (Sub-Network Access Protocol)/LLC (Local Link Control) protocol header has a 2-byte Ethernet type field for identifying the protocol of a higher layer transported by the protocol of a MAC sublayer. "0800" and "0806" are respectively assigned to a ARP (Address Resolution Protocol) and IP (Internet Protocol) (to be described later) by the IETF (Internet Engineering Task Force).

The following protocols are based on the architecture of the DARPA (Defence Advanced Research Projects Agency). IP is used to relay/transfer data by connecting networks such as LAN segments to each other. An IP header has a protocol number and is used to identify a higher protocol transported by IP.

"1", "6", and "17" are respectively assigned to ICMP (Internet Control Message Protocol), TCP (Transmission Control Protocol), and UDP (User Datagram Protocol) by the IETF. An IP header has a destination IP address and a source IP address. In general, each address is constituted by an IP subnetwork address added in units of LAN segments and a host address for identifying each system coupled within an IP subnetwork.

The destination IP address is used to relay data between different LAN segments through a router. FIG. 7C shows a protocol stack used when data is transferred between terminals coupled to different LAN segments by using the router. When data is transferred from a given LAN segment to a different LAN segment, i.e., the IP subnetwork address, the corresponding terminal or router transmits the data with the destination MAC address of the router which relays the data next being added.

In this case, as is apparent, the destination IP subnetwork address differs from the source IP subnetwork address. Upon reception of such data, the router relabels the destination MAC address corresponding to the destination IP address, and relays/transfers the resultant data. In order to obtain the destination MAC address, the following ARP is used.

The ARP is used to obtain the correspondence between the IP address and the MAC address. If the MAC address corresponding to the IP address of the system to which the data is to be transferred next is not known, the terminal or the router broadcasts the ARP data in the IP subnetwork, i.e., the LAN segment. In response to this data, the system having the IP address designated by ARP returns the ARP data including the self-MAC address.

ICMP is a protocol for exchanging monitor information and control information between terminals and network servers, and transported by using IP. If, for example, a failure occurs in routing an IP packet, the ICMP serves to notify other LAN terminals of this. ICMP is complementary to IP. Each router or LAN terminal must always incorporate ICMP together with IP.

TCP and UDP are protocols which are dependent on end systems such as LAN terminals, and used to transfer data between end systems. TCP is used for an application demanding high reliability, e.g., FTP (File Transfer Protocol), TELNET (Telecommunications Network), or SMTP (Simple Mail Transfer Protocol) (to be described later).

UDP is used for an application which does not demand much reliability, e.g., SNMP (Simple Network Management Protocol). Each of the protocol headers of TCP and UDP has a 2-byte port address for identifying an application process for communication performed by using TCP or UDP. "21", "23", "25", and "161" are respectively added to FTP, TELNET, SMTP, and SNMP by the IETF.

For example, FTP, TELNET, SMTP, and SNMP are protocols on the application layer. FTP is used to transfer a file. TELNET is used to access a remote terminal. SMTP is used to transfer an E-mail. These protocol data are transferred by using TCP and IP (to be described later). SNMP is a protocol for exchanging management information between a management terminal and an object to be managed, e.g., a network server. This protocol data is transferred by using UDP and IP (to be described later).

The use of ATM techniques has been studied to increase the processing speed of such an existing LAN and improve its performance. ATM is essentially a communication scheme in which information which a user wants to transmit is segmented into fixed-length data, headers are added to the respective data to generate fixed-length blocks called cells, and a multiplex switching operation is performed in units of cells. In this scheme, transmission bands for data transmission between systems can be flexibly allocated, and the communication quality demanded by an application can be easily achieved.

A system which uses a technique of allocating flexible resources between arbitrary points and performing a switching operation by using ATM, and incorporating an existing LAN will be called an ATM-LAN. In an ATM network, by using the ATM switching technique, traffic management and security management can be performed between terminals at physically different points, regarding them as terminals belonging to the same logical LAN segment. Such a LAN is called a virtual LAN.

FIG. 9 explains a virtual LAN constituted by an ATM-LAN. Referring to FIG. 9, each of network servers 161 to 163 is a relay system for performing conversion between ATM and existing LAN protocols, and providing a bridge function for forming a virtual LAN segment. Point-to-point ATM connections 181 to 183 are set between the network servers 161 to 163 so that LAN segments 151 to 153 can be constituted by terminals accommodated in the different network servers 161 to 163 regardless of the physical positions of the terminals.

These LAN segments 151 to 153 will be referred to as virtual LAN segments, in particular. Traffic management and security management can be performed in the virtual LAN segments 151 to 153 in the same manner as in the existing LAN segments 131 to 133 shown in FIG. 6.

The LAN terminal groups 101 and 102 belonging to the same LAN segment 131 in FIG. 6 are respectively accommodated in the different network servers 161 and 162 in FIG. 9. However, by setting the ATM connection 181 between these network servers 161 and 162, the LAN terminal groups 101 and 102 constitute a single virtual LAN segment 151.

Similarly, the LAN terminal groups 103 and 104 belonging to the LAN segment 132 in FIG. 6 are respectively accommodated in the different network servers 162 and 163 in FIG. 9. The LAN terminal groups 105 and 106 belonging to the LAN segment 133 in FIG. 6 are respectively accommodated in the different network servers 163 and 161 in FIG. 9. However, by setting the ATM connections 182 and 183 between these network servers 162 and 163, and 161 and 163, the terminal groups 103 and 104, and 105 and 106 respectively constitute single virtual LAN segments 152 and 153.

FIG. 10 explains a protocol stack as a logical arrangement for data transfer between LAN terminals within a single virtual LAN segment. In this case, each network server has a transparent bridge function, and is provided with an ATM MAC sublayer for converting existing LAN protocol data into ATM protocol data. Each network server encapsulates a MAC frame within an ATM protocol header, as needed.

FIG. 11 explains a protocol stack as a logical arrangement for data transmission between LAN terminals belonging to different virtual LAN segments. In this case, similar to an existing LAN, data transfer is performed by using a router. The router belongs to the different virtual LAN segments. In a subnetwork having a destination IP subnetwork address, therefore, the router obtains the MAC address of the destination terminal from the destination IP address, relabels the IP address with the MAC address, and transfers the data by using the ATM connection corresponding to the new MAC address.

FIG. 12 shows a conventional network server.

A transfer processing unit 1 starts a data transfer unit 5 to transfer data from a predetermined terminating unit to a predetermined terminating unit. The transfer processing unit 1 is constituted by an address check section 11 for checking a source IP subnetwork address, a source MAC address, and a terminating unit (an ATM connection which has received data if this unit is an ATM terminating unit) which has received data, and transferring them to an address cache memory (to be referred to as a cache hereinafter) 2, a bridge section 12 for determining, on the basis of the destination MAC address, the unit number of a terminating unit to which the data is to be transferred, and a connection determination section 13 for determining, on the basis of address information, an ATM connection to which the data is to be transferred in the ATM terminating unit.

The cache 2 holds a IP subnetwork address, an MAC address, and a terminating unit number (a set of data indicating a correspondence with an ATM connection in the case of an ATM terminating unit). For example, in the network server 161 (see FIG. 9), the ATM connection 183 corresponds to an IP subnetwork address corresponding to the virtual LAN segment 153, and the ATM connection 181 corresponds to an IP subnetwork address corresponding to the virtual LAN segment 151.

LAN terminating units (LAN I/F) 3 accommodate existing LAN terminals, and terminate the MAC protocol. An ATM terminating unit (ATM I/F) 4 processes the AAL (ATM Adaptation Layer) and the ATM protocol. The data transfer unit 5 transfers data from a predetermined terminating unit to another predetermined terminating unit in accordance with an instruction from the bridge section 12 of the transfer processing unit 1.

The operation of a network server, especially in a case wherein the network server has a plurality of LAN terminating units and one ATM terminating unit, will be described next. Each LAN terminating unit 3 transmits/receives data by performing the above MAC protocol processing. Data transferred from the data transfer unit 5 is transmitted by using the MAC protocol. Data received by using the MAC protocol is transmitted from the data transfer unit 5 to a predetermined terminating unit determined by the transfer processing unit 1.

The ATM terminating unit 4 encapsules existing LAN protocol data into ATM protocol data in the following manner. As shown in FIG. 8, in the AAL, the SSCS (Service Specific Convergence Sublayer) removes the FCS (Frame Check Sequence) field used for data error detection from the MAC frame to be transferred. Thereafter, the CPCS (Common Part Convergence Sublayer) attaches a trailer of ALL5 containing data indicating the length of the data from the SSCS and an FCS for data error detection for the data to the resultant MAC frame.

Finally, the SAR (Segregation And Reassembly) layer breaks up the frame into segments each consisting of 48 bytes. The ATM layer attaches a 5-byte header containing a VC (Virtual Channel) or VP (Virtual Path) through which the data is to be transferred and an ATM connection identifier to each segment to assemble a cell. Note that ATM protocol data is converted into existing LAN protocol data by a reverse process to that described above.

A network server needs to associate the unit number of a terminating unit to which data is to be transferred with a destination MAC address by using the transparent bridge function, as well as performing such protocol conversion. The ATM terminating unit 4 needs to associate an ATM connection to which the data is to be transferred with the MAC address. The transfer processing unit 1 performs these operations while looking up the cache 2, as follows.

FIG. 13 shows transfer processing of an IP packet received by the LAN terminating unit 3 or the ATM terminating unit 4. The address check section 11 registers a set of a source IP subnetwork address, a source MAC address, and a terminating unit number or VCC, contained in the received data, in the cache 2 (step S1). The bridge section 12 then looks up the cache 2 to check whether a terminating unit number can be obtained from a destination MAC address (step S2). If a terminating unit number can be obtained, the bridge section 12 notifies the data transfer unit 5 of the unit number, thereby transferring the data to the terminating unit indicated by the unit number (step S3).

If it is determined in step S2 that no terminating unit number can be obtained, the bridge section 12 looks up the cache 2 to check all the terminating unit 5 numbers corresponding to the same IP subnetwork address except for the received terminating unit number. The data transfer unit 5 then transfers the data to these terminating units. In step S3 or S4, it is checked whether the data has been transmitted to the ATM terminating unit 4 (step S5).

If it is determined in step S5 that the data has been transferred to the ATM terminating unit 4, the connection determination section 13 determines, on the basis of a set of the received IP subnetwork address and the destination MAC address, an ATM connection to which the data is to be transmitted, and notifies the ATM terminating unit 4 of it (step S6). With this operation, the data is transmitted to the desired ATM connection. If it is determined in step S5 that the data has not been transferred to the ATM terminating unit 4, the IP packet transfer processing is terminated.

In such a conventional network server, when data transfer is to be performed within a single IP subnetwork, communication data between application processes such as FTP, TELNET, SMTP, and SNMP data are transferred altogether within a single virtual LAN. For this reason, the quality of service (QOS) associated with delays and discarding of data transfer cannot be finely controlled for each application.

As indicated by the protocol stack in FIG. 11 as well, when data is to be transferred between a pair of LAN terminals having different subnetwork addresses, in particular, the data is exchanged through a router. For this reason, it takes time for the router to assemble IP data from ATM cells, perform protocol processing of the IP data, and segment the IP data into ATM cells, resulting in a decrease in throughput in data transfer.

SUMMARY OF THE INVENTION

It is an object of the present invention to provide a network server which can realize a LAN that guarantees QOS for each application.

It is another object of the present invention to provide a network server which allows data transfer between different subnetworks without using any router.

In order to achieve the above objects, according to the present invention, there is provided a network server comprising a plurality of LAN terminating units which are respectively connected to LAN terminals constituting a plurality of virtual LAN segments and terminate protocols on a LAN MAC sublayer, an ATM terminating unit which is connected to an ATM network and terminates an AAL and an ATM protocol, data transfer means for transferring received data to one of the LAN terminating units and the ATM terminating unit in correspondence with a destination MAC address obtained from data received by the LAN terminating units and the ATM terminating unit, identifier check means for checking at least an Ethernet type in an SNAP of the received data, and connection determination means for, when the received data is transferred from the data transfer means to the ATM terminating unit, determining an ATM connection to which the received data is to be transmitted, on the basis of a set of a destination MAC address and a destination IP subnetwork address which are obtained from the received data, and an identifier including at least an Ethernet type detected by the identifier check means, and notifying the ATM terminating unit of the determined ATM connection.

BRIEF DESCRIPTION OF THE DRAWINGS

FIG. 4 is a flow chart showing data transfer processing in the network server in FIG. 3;

FIG. 5 is a view for explaining a protocol stack for data transfer between different IP subnetworks;

FIG. 9 is a schematic view for explaining the arrangement of a general virtual LAN;

FIG. 11 is a view for explaining a protocol stack for data transfer between different IP subnetworks through the general virtual LAN;

FIG. 12 is a block diagram showing a conventional network server; and

FIG. 13 is a flow chart showing data transfer processing in the conventional network server.

DESCRIPTION OF THE PREFERRED EMBODIMENTS

The present invention will be described below with reference to the accompanying drawings.

The present invention will be described on the premises of the following ATM network. As shown in FIG. 9, in this ATM network, five types of ATM connections for FTP, TELNET, SMTP, SNMP, and other management (ARP and ICMP) are set between each pair of network servers 161 and 162, 162 and 163, and 163 and 161, and 3×5=12 types of virtual LANs are constituted by these connections on the basis of sets of IP subnetworks and user and management applications.

Figure 1:
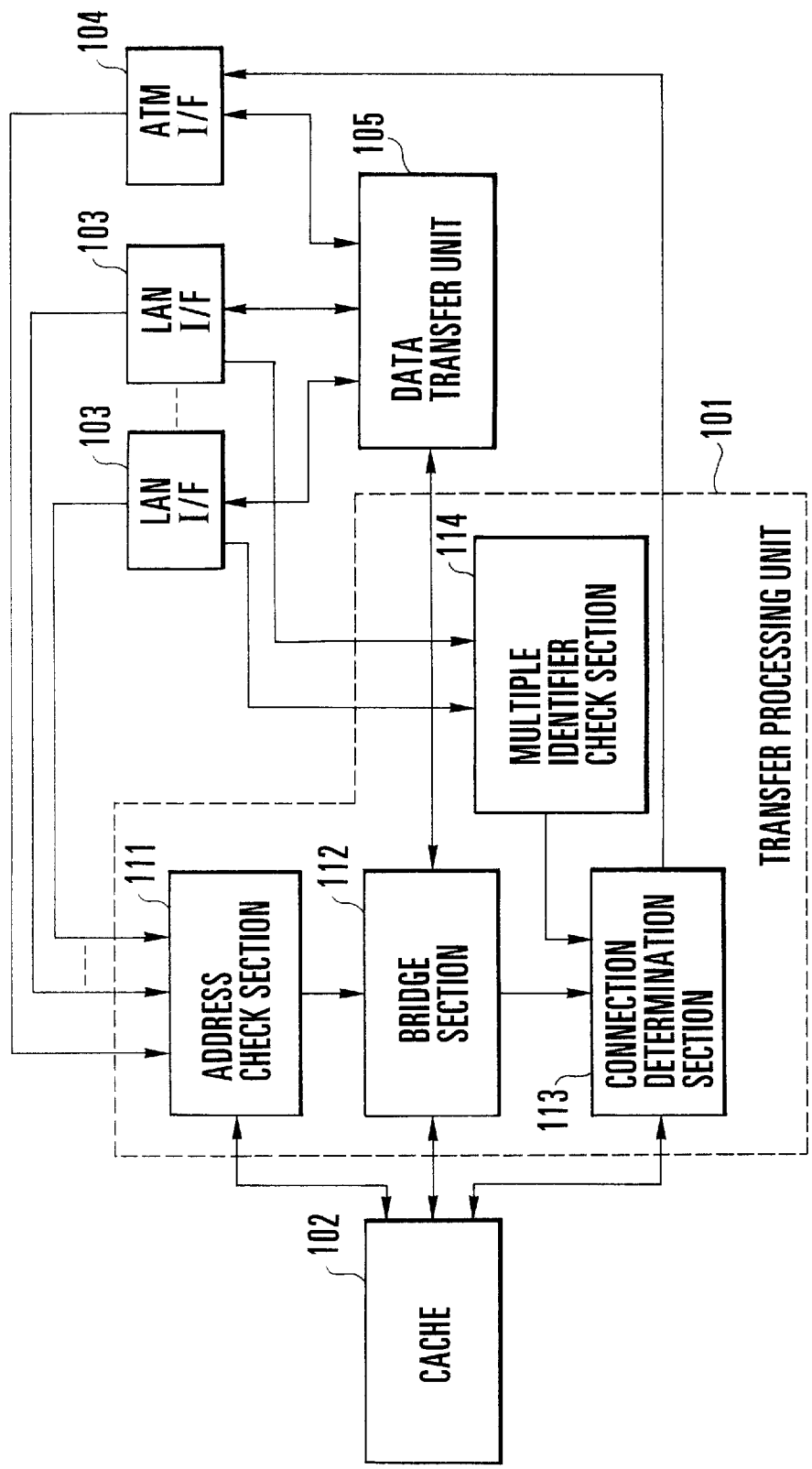
FIG. 1 is a block diagram showing a network server according to a first embodiment of the present invention.

FIG. 1 shows a network server according to the first embodiment of the present invention. Referring to FIG. 1, reference numeral 101 denotes a transfer processing unit for starting a data transfer unit 105 to transfer data from a predetermined terminating unit to another predetermined terminating unit; 102, an address cache memory (to be referred to as a cache hereinafter) in which a set of an IP subnetwork address, a MAC address, and a terminating unit number or an ATM connection identifier in an ATM terminating unit is registered; 103, a LAN terminating unit (LAN I/F) which accommodates an existing LAN and terminates a MAC protocol; 104, an ATM terminating unit (ATM I/F) for processing the AAL and the ATM protocol; and 105, a data transfer unit for transferring data from a predetermined terminating unit to another predetermined terminating unit in accordance with an instruction from the transfer processing unit 101.

Referring to the transfer processing unit 101, reference numeral 111 denotes an address check section for checking a source IP subnetwork address, a source MAC address, and a terminating unit (an ATM connection which has received the data in the case of the ATM terminating unit 104) which has received the data, and transferring them to the cache 102; 112, a bridge section for determining, on the basis of a destination MAC address, the unit number of a terminating unit to which the data is to be transferred; 113, a connection determination section for determining, on the basis of address information, an ATM connection to which the data is to be transferred from the ATM terminating unit 104; and 114, a multiple identifier check section (identifier check means) for checking a multiple identifier constituted by an Ethernet type, a protocol number, and a port address.

Figure 2:
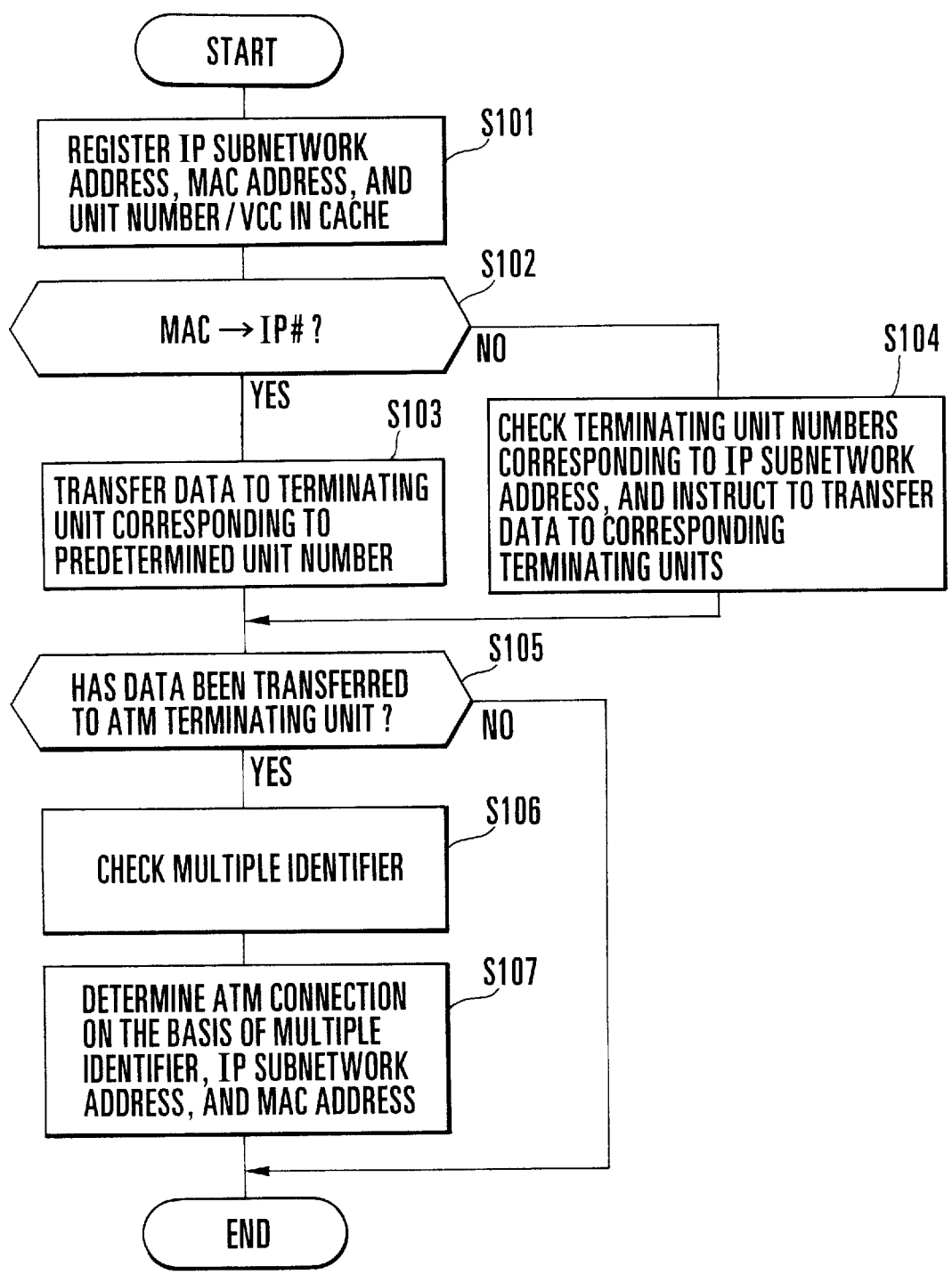
FIG. 2 is a flow chart showing data transfer processing in the network server in FIG. 1.

FIG. 2 shows data transfer processing in the network server in FIG. 1. This processing will be described by taking a case wherein an IP packet is received by a LAN terminating unit or an ATM terminating unit, in particular, as an example. First of all, the address check section 111 registers a set of a source IP subnetwork address, a source MAC address, and the unit number of the LAN terminating unit which has received the data or the corresponding ATM connection identifier, contained in the IP packet, in the cache 102 on the basis of notification from the LAN terminating unit 103 or the ATM terminating unit 104 which has received the IP packet (step S101).

Subsequently, the bridge section 112 looks up the cache 102 to check whether a terminating unit number can be obtained from the destination MAC address (step S102). If YES in step S102, the bridge section 112 instructs the data transfer unit 105 to transfer the data to the terminating unit indicated by the obtained unit number (step S103). If NO in step S102, the bridge section 112 looks up the cache 102 to check terminating unit numbers corresponding to the same IP subnetwork address except for the unit number of the terminating unit which has received the data, and instructs to transfer the data to all the terminating units corresponding to the unit numbers (step S104).

The connection determination section 113 checks whether the data has been transferred to the ATM terminating unit 104 in steps S103 and S104 (step S105). If it is determined that the data has been transferred to the ATM terminating unit 104, the multiple identifier check section 114 checks a predetermined identifier from the received data (step S106). An ATM connection to which the data is to be transmitted is determined on the basis of the identifier, the received IP subnetwork address, and the destination MAC address, and the ATM terminating unit 104 is notified of it (step S107). With this operation, the data is transmitted to a desired ATM connection, and the data transfer processing is terminated.

If the connection determination section 113 determines in step S105 that the data has not been transferred to the ATM terminating unit 104, i.e., the data has been transferred to at least one LAN terminating unit 103, the processing is terminated. The data transferred to the LAN terminating units 103 are sent to a LAN terminal to be selectively received.

When data is to be transmitted to an ATM connection, an IP subnetwork assigned to a conventional virtual LAN segment is further segregated into LAN management/control applications such as ARP, ICMP, and SNMP, or virtual LANs corresponding to user applications such as FTM, TELNET, and STMP. In this case, each of ARP, ICMP, SNMP, FTP, TELNET, and STMP can be identified by an Ethernet type, a protocol number, and a port address. A set of an Ethernet type, a protocol number, and a port address will be referred to as a multiple identifier, in particular.

Note that "0" is assigned to each protocol data identified by only an Ethernet type without using a protocol number or a port address. Numbers are assigned to protocols by the IETF in the following manner: (0806, 0, 0) to ARP; (0800, 1, 0) to ICMP because it is transferred by using IP; (0800, 17, 161) to SNMP because it is transferred by using UDP/IP; (0800, 6, 21) to FTP because it is transferred by using TCP/IP; (0800, 6, 23) to TELNET; and (0800, 6, 25) to SMTP.

ATM connections to which data are to be transferred are set between the network servers 161 to 163 on the basis of sets of multiple identifiers and IP subnetwork addresses. IP data are exchanged between virtual LANs having the same port address even if they have different IP subnetwork addresses. However, no IP data are exchanged between virtual LANs having different port addresses.

Figure 10:
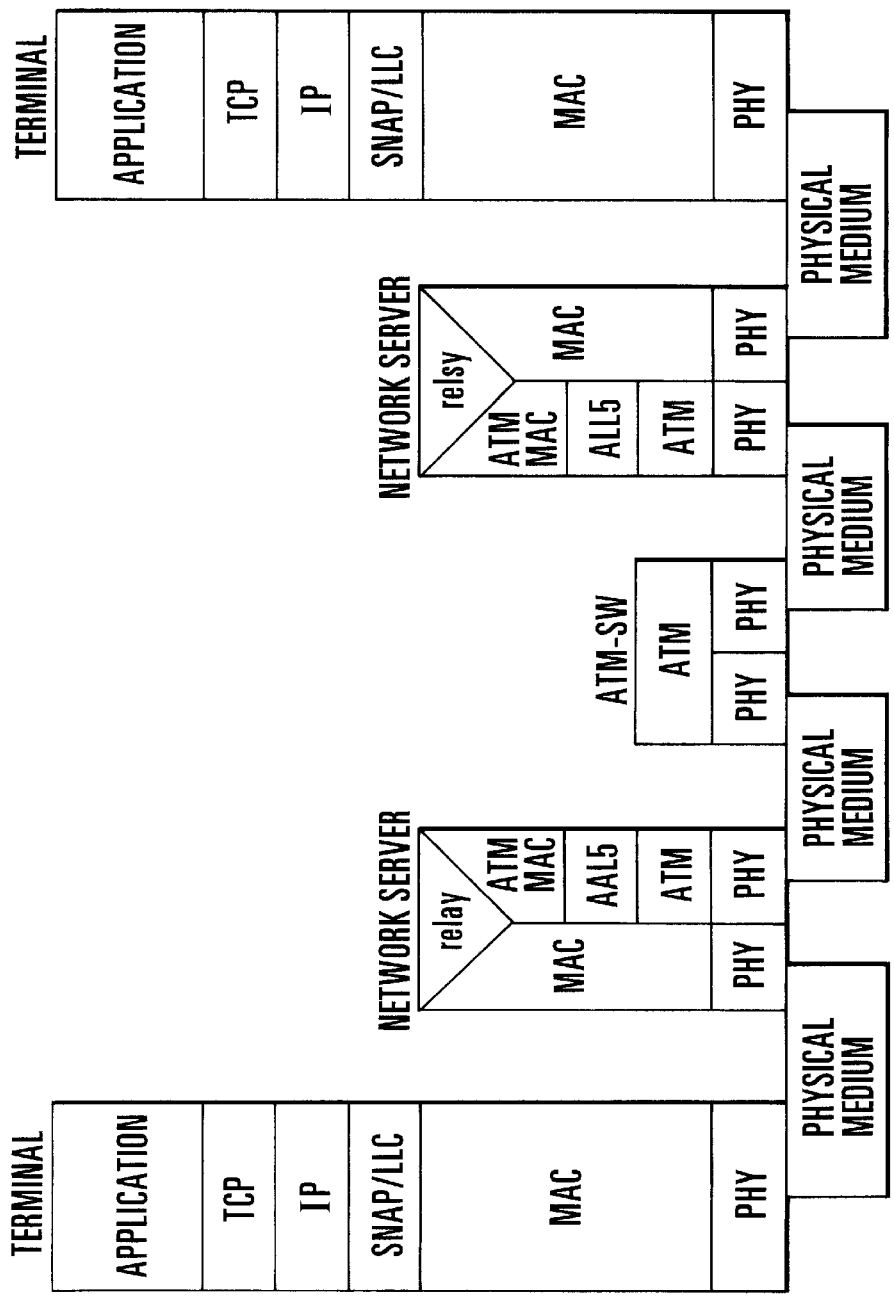
FIG. 10 is a view showing a protocol stack for data transfer in the same IP subnetwork through a general virtual LAN.

With this arrangement, when data is to be transferred between terminals in a single virtual LAN segment through an ATM network, the network servers 161 to 163 serve as bridges, as in the prior art shown in FIG. 10. In this case, an ATM connection to which the data is to be transferred is determined on the basis of a multiple identifier, a destination IP subnetwork address, and the MAC address of a destination terminal to which the data is to be transmitted. The data is then transmitted from the ATM terminating unit 104 on the basis of this determination.

As described above, when the router in FIG. 11 is to be used to transfer IP data between terminals belonging to virtual LAN segments having different IP subnetwork addresses, the router also determines an ATM connection to which the data is transferred on the basis of a multiple identifier, a destination IP subnetwork address, and the MAC address of a destination terminal to which the data is to be transmitted. In this case, when received data is transferred to the ATM terminating unit 104, an ATM connection to which the data is to be transmitted is determined on the basis of a set of a destination MAC address, an Ethernet type, and a destination IP subnetwork address, a set of a destination MAC address, an Ethernet type, a destination IP subnetwork, and a protocol number, or a set of a destination MAC address, an Ethernet type, a destination IP subnetwork address, and a protocol number or a port address. The quality of service associated with delays and discarding of data transfer can therefore be controlled for each application.

Figure 3:
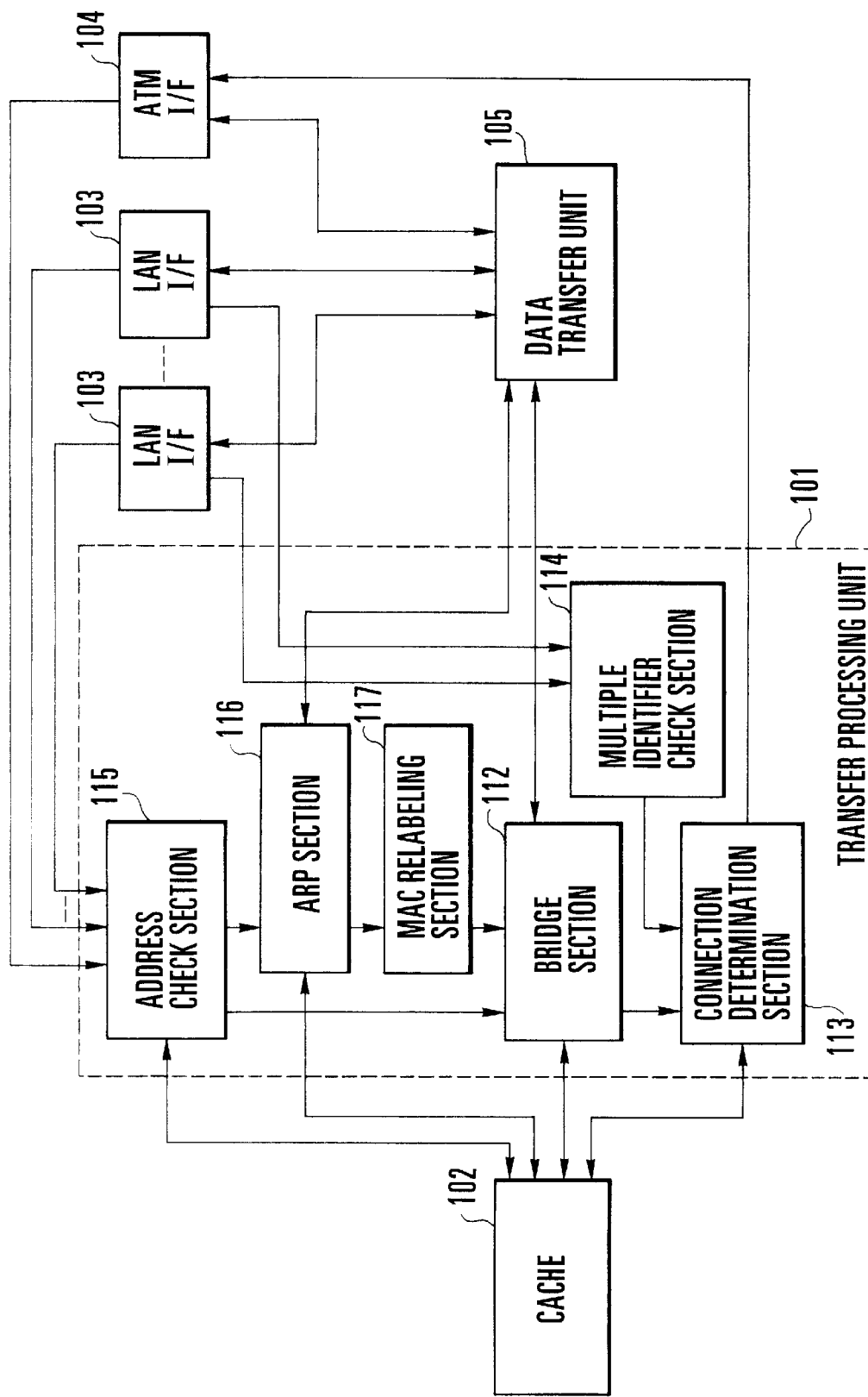
FIG. 3 is a block diagram showing a network server according to the second embodiment of the present invention.
Figure 6:
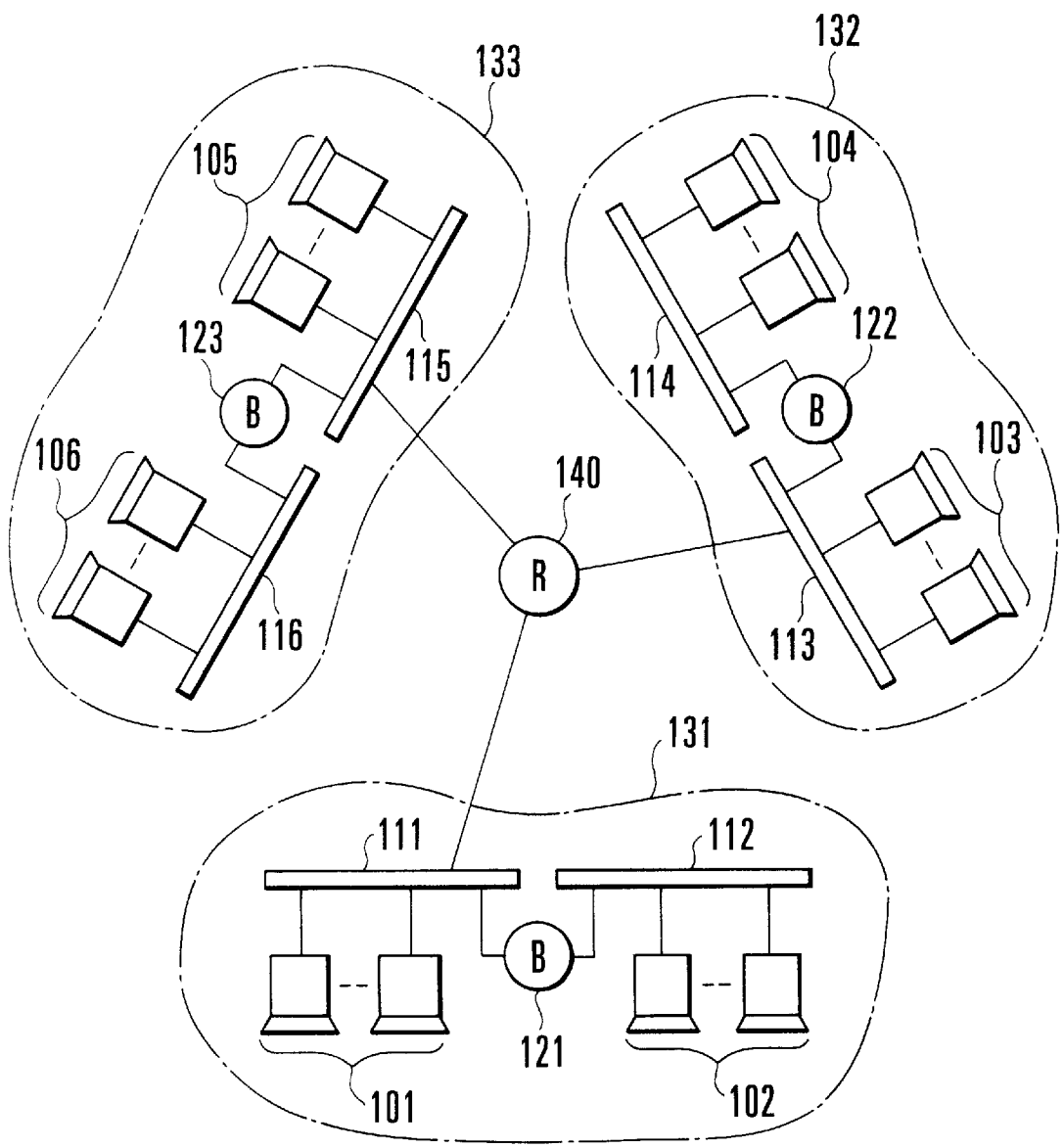
FIG. 6 is a schematic view showing the arrangement of a conventional LAN.
Figure 7:
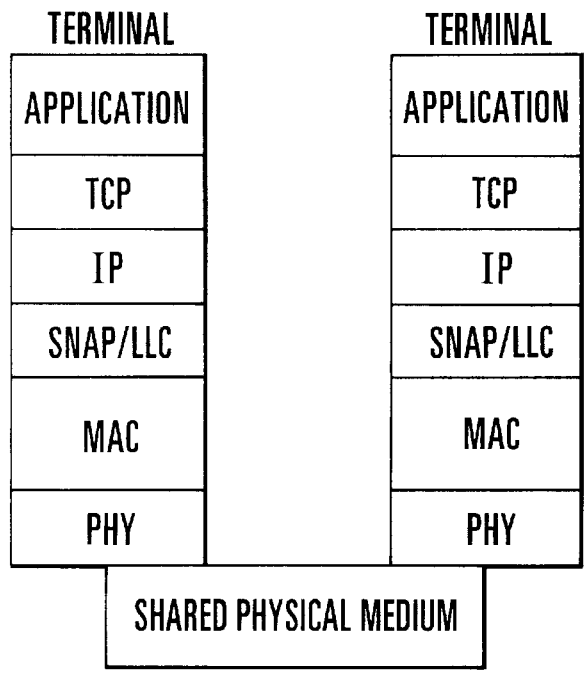
FIG. 7A–7D are views showing a protocol stack for data transfer in a conventional LAN.
Figure 7:
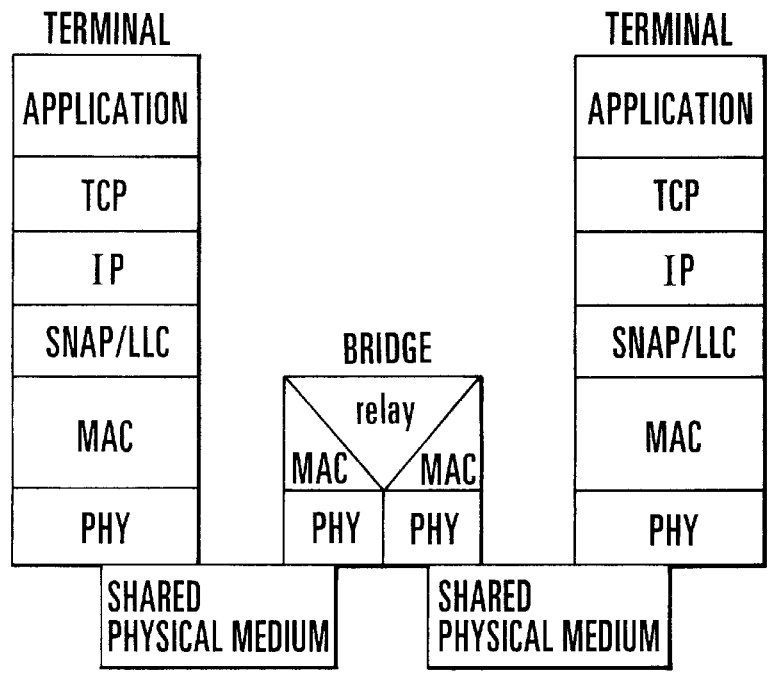
Figure 7C:
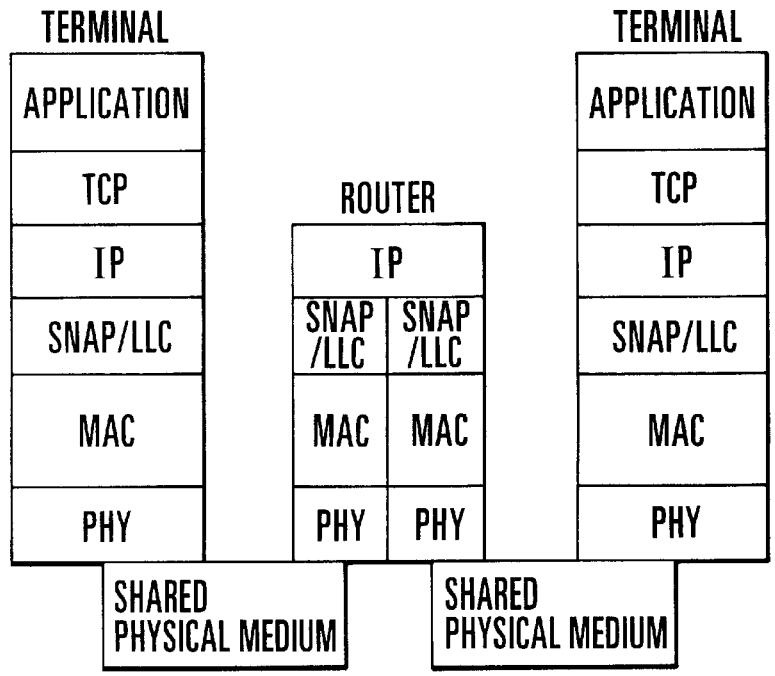
Figure 7D:
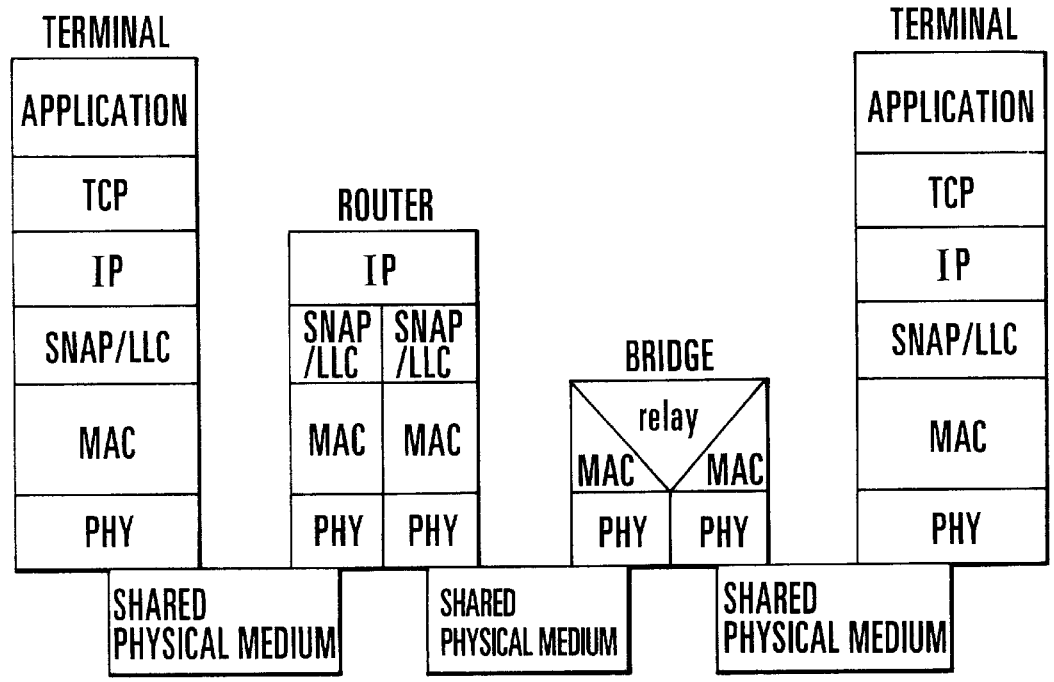
Figure 8:
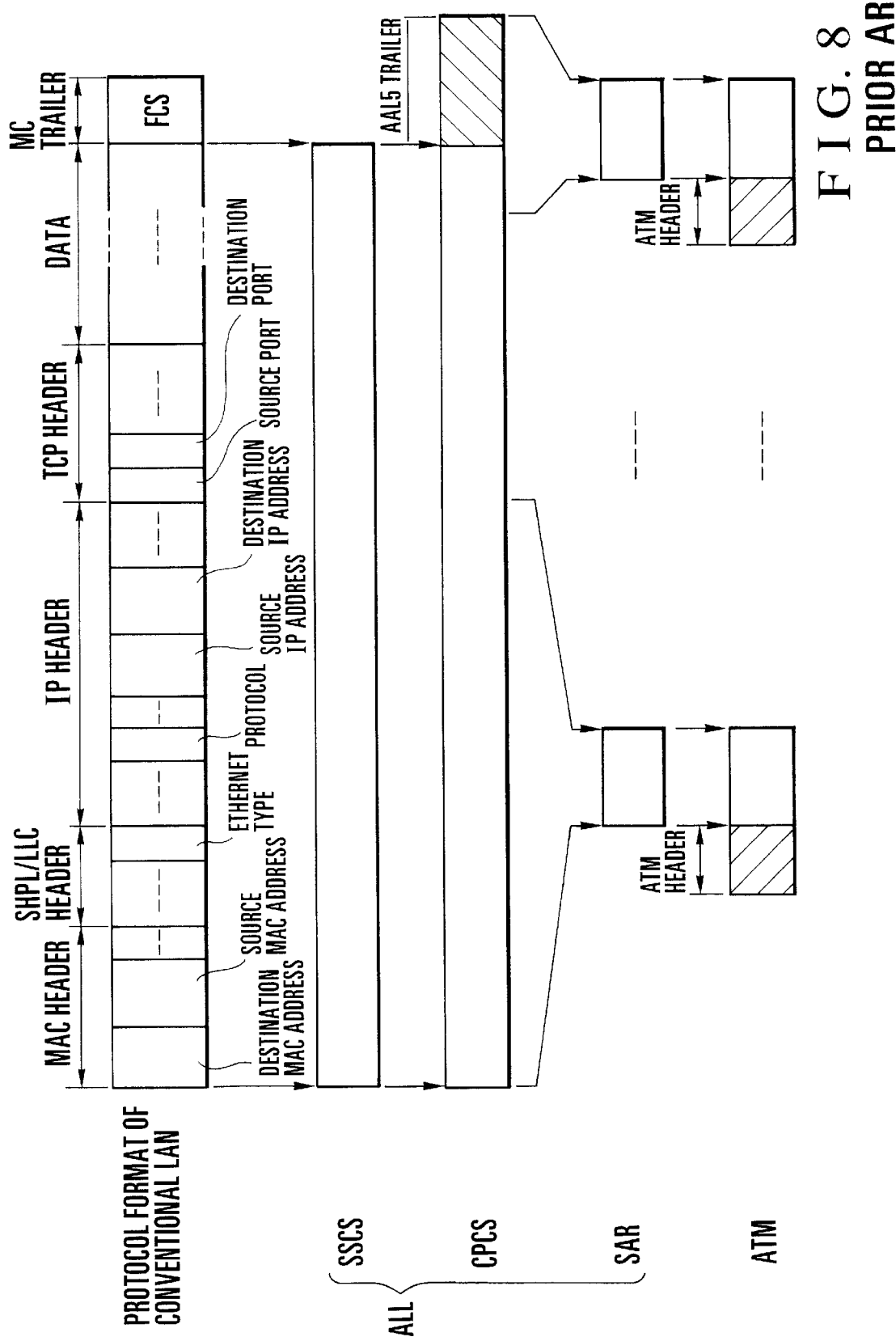
FIG. 8 is a view for explaining a protocol header and cell segmentation in the conventional LAN.

FIG. 3 shows a network server according to the second embodiment of the present invention. The same reference numerals in FIG. 3 denote the same elements as in FIG. 1. The second embodiment differs from the first embodiment in that an ARP section 116 and a MAC relabeling section 117 are added, together with an address check section 115. Referring to FIG. 3, the address check section 115 checks a set of a source IP address, a source MAC address, and the unit number of a terminating unit which has received data or a corresponding ATM connection, and registers them in a cache 102.

The ARP section 116 generates ARP data to resolve a destination MAC address from a destination IP address, and broadcasts the ARP data within an IP subnetwork through a data transfer unit 105 and a predetermined terminating unit. The ARP section 116 then registers a set of the destination MAC address, a LAN terminating unit number or an ATM connection identifier, which are obtained in response to the ARP data, and the destination IP address in the cache 102. The MAC relabeling section 117 relabels the destination MAC address of the received data with the MAC address resolved from the destination IP address.

The data transfer operation of the network server in FIG. 3 will be described next with reference to FIG. 4 by taking a case wherein an IP packet is received by a LAN terminating unit or an ATM terminating unit, as an example. First of all, the address check section 115 registers a set of a source IP subnetwork address, a source MAC address, and the unit number of a LAN terminating unit which has received the data or a corresponding ATM connection identifier, contained in the received IP packet, in the cache 102 (step S201).

Subsequently, it is checked whether the destination MAC address of the received data coincides with that of the server (step S202). If YES in step S202, the bridge section 112 looks up the cache 102 to check whether a destination MAC address can be obtained from the destination IP address (step S203). If it is determined in step S203 that no destination MAC address can be obtained, the ARP section 116 generates predetermined ARP data from the destination IP address and the Ethernet type (step S204). The ARP data is then broadcasted within the IP subnetwork through the data transfer unit 105 and a predetermined terminating unit, and a set of the destination MAC address, a LAN terminating unit number or an ATM connection identifier, which are obtained in response to the ARP data, and the destination IP address is registered in the cache 102 (step S205).

Subsequently, the MAC relabeling section 117 looks up the cache 102 to obtain a destination MAC address corresponding to the destination IP address, and relabels the destination MAC address of the received data with the new destination MAC address (step S206). If it is determined in step S203 that a terminating unit number can be obtained from the destination MAC address, the MAC relabeling section 117 immediately looks up the cache 102 to relabel the destination MAC address of the received data with the new destination MAC address in step S206.

The flow then advances to steps S207 to S212 to transmit data to a desired ATM connection by the same processing as in steps S102 to S107 in FIG. 2. If it is determined in step S202 that the destination MAC address of the received data does not coincide with that of the server, the flow also advances to steps S207 to S212 to perform the same processing as that described above.

As described above, when no router is used to transfer data between virtual LAN segments having different IP subnetwork addresses, a protocol stack like the one shown in FIG. 5 is used as the logical arrangement of a LAN. That is, each network server has a router function as well as a bridge function. When data is to be transferred from a given virtual LAN to a virtual LAN which has the same application identified by a port number as that of the given virtual LAN but has an IP subnetwork address different from that of the given virtual LAN, the data is transmitted from a terminal by using the MAC address of the network server as a destination MAC address.

In response to this operation, the network server transmits ARP data within the destination IP subnetwork to obtain the MAC address of a destination terminal, and the MAC address of the received data is relabeled with this destination MAC address. The data is then passed to the above bridge function, and transmitted to an ATM connection determined on the basis of the MAC address of the destination terminal to which the data is to be transmitted.

As has been described above, the present invention has the identifier check means for checking predetermined identifiers such as an Ethernet type, a protocol number, and a port address from data received by an arbitrary terminating unit. With this arrangement, when data is transferred to an ATM terminating unit, an ATM connection to which the data is to be transmitted is determined on the basis of a set of a destination MAC address and a destination IP subnetwork address extracted from the data by the identifier check means. The quality of service associated with delays and discarding of data transfer can therefore be performed for each application such as a network management application, an address resolution application, a file transfer application or a mail system application.

In addition, the present invention includes the MAC relabeling means for relabeling the destination MAC address of data with an MAC address corresponding to the destination IP address of the data when the destination MAC address of the data coincides with the MAC address of the server itself. With this operation, the data is transferred to a terminating unit corresponding to the new destination MAC address. Therefore, a router function can be realized in a network server, and a process of assembling IP data from ATM cells, performing IP protocol processing, segmenting the IP data into ATM cells, which is executed every time data passes through a router in the prior art, can be omitted, thereby improving the throughput of data.

What is claimed is:

1. A network server comprising:

a plurality of LAN terminating units which are respectively connected to LAN terminals constituting a plurality of virtual LAN segments and terminate protocols on a LAN MAC sublayer;

an ATM terminating unit which is connected to an ATM network and terminates a PAL and an ATM protocol;

data transfer means for transferring received data to one of said LAN terminating units and said ATM terminating unit in correspondence with a destination MAC address obtained from data received by said LAN terminating units and said ATM terminating unit;

identifier check means for checking at least an Ethernet type in a sub-network access protocol (SNAP) of the received data; and connection determination means for, when the received data is transferred from said data transfer means to said ATM terminating unit, determining an ATM connection to which the received data is to be transmitted, on the basis of a set of a destination MAC address and a destination IP subnetwork address which are obtained from the received data, and an identifier including at least the Ethernet type detected by said identifier check means, and notifying said ATM terminating unit of the determined ATM connection.

2. A server according to claim 1, wherein said identifier check means checks an Ethernet type and a protocol number in an IP header of the received data, and wherein said connection determination means determines an ATM connection to which the data is to be transmitted, on the basis of a set of a destination MAC address and a destination IP subnetwork address which are obtained from the received data, and an identifier including the Ethernet type and a protocol number checked by said identifier check means, when the received data is transferred to said ATM terminating unit.

3. A server according to claim 1, wherein said identifier check means checks an Ethernet type, a protocol number in an IP header of the received data, and a port address in a TCP/UDP header of the received data, and wherein said connection determination means determines an ATM connection to which the data is to be transmitted, on the basis of a set of a destination MAC address and a destination IP subnetwork address which are obtained from the received data, and an identifier including the Ethernet type, a protocol number, and a port address checked by said identifier check means, when the received data is transferred to said ATM terminating unit.

4. A server according to claim 1, further comprising:

memory means in which a set of the destination MAC address, one of a terminating unit number or an ATM connection identifier, which are obtained from the received data, and a destination IF subnetwork address is registered; and bridge means for, when the terminating unit number is obtained upon looking up said memory means, instructing said data transfer means to transfer the received data to one of said LAN terminating units and said ATM terminating unit which corresponds to the obtained unit number.

5. A server according to claim 4, wherein said bridge means instructs to transfer the received data to all of said LAN terminating unit and said ATM terminating unit which correspond to unit numbers other than a unit number of a terminating unit which has received the data, when no terminating unit number is obtained from said memory means.

6. A server according to claim 1, further comprising MAC relabeling means for relabeling a destination MAC address of the received data with a MAC address corresponding to a destination IP address of the received data, when the destination MAC address of the received data coincides with a MAC address of a network server itself, and wherein said data transfer unit transfers the received data to said LAN terminating unit and said ATM terminating unit which correspond to the destination MAC address set by said MAC relabeling means.

7. A server according to claim 6, further comprising:

memory means in which a set of the destination MAC address, one of a terminating unit number or an ATM connection identifier, which are obtained from the received data, and a destination IF subnetwork address is registered; and address resolution protocol (ARP) means for, when no destination MAC address is obtained from the destination IF address upon looking up said memory means, obtaining a destination MAC address corresponding to the designation IF address by broadcasting ARP data within an IF subnetwork through said LAN terminating unit and said ATM terminating unit, and registering a set of the obtained destination MAC address, the destination IF address, a LAN terminating unit, and an ATM connection identifier in said memory means.

8. A server according to claim 1, wherein a virtual LAN accommodating said LAN terminals on the ATM network regardless of physical positions of said LAN terminals is realized.

* * * * *